United States Patent

[11] 3,616,935

| [72] | Inventors | Jim Love<br>Concord;<br>George W. Holmes, Walnut Creek, both of Calif. |
|---|---|---|
| [21] | Appl. No. | 9,069 |
| [22] | Filed | Feb. 5, 1970 |
| [45] | Patented | Nov. 2, 1971 |
| [73] | Assignee | The Dow Chemical Company<br>Midland, Mich. |

[54] PREPARATION OF ANTITHROMBOGENIC SURFACES
11 Claims, No Drawings

[52] U.S. Cl. .................................................. 210/500, 424/183
[51] Int. Cl. .................................................. B01d 39/00
[50] Field of Search .......................................... 23/258.5; 117/81, 83; 210/22, 321, 500, 506; 424/14, 16, 183

[56] References Cited

UNITED STATES PATENTS

| 3,441,142 | 4/1969 | Oja ............................... | 210/500 X |
| 3,522,346 | 7/1970 | Chang ........................... | 210/321 X |

OTHER REFERENCES

Merrill, E. W. et al.: Trans. Amer. Soc. Artif. Int. Organs., 139– 144 (1966) Georgetown Univ. Printing Dept.

*Primary Examiner*—Reuben Friedman
*Assistant Examiner*—R. W. Burks
*Attorneys*—Griswold and Burdick, H. L. Aamoth and Albin R. Lindstrom ABSTRACT: Antithrombogenicity may be obtained by irreversibly adsorbing polyalkylenimine on the surface of a variety of materials such as cellulose, glass, silicon rubber and the like and after thoroughly washing to remove any unadsorbed polymer heparinizing the surface by treating it with a solution of sodium heparin.

PREPARATION OF ANTITHROMBOGENIC SURFACES

REFERENCES

The invention described herein was made in the course of, or under, a contract with the department of Health, Education and Welfare.

BACKGROUND OF THE INVENTION

The accelerating scope of research of prosthetic devices such as cardiac valves, artificial kidneys, blood oxygenators and the like has emphasized the need for materials which are antithrombogenic or for means to impart antithrombogenicity to materials presently used in the manufacture of such devices.

Gott et al. (Science 142, 1297, 1963) reported on the preparation of graphite-benzalkonium-heparin surfaces and their success in reducing thrombus formation with this surface when in contact with fresh blood. Other investigators have since studied other methods for retaining heparin on surfaces, e.g. U.S. Pat. No. 3,441,142.

Britton et al. (J. Biomed. Mater. Res. 2, 429-441, 1968) reported on their attempts to liquid-phase aminoethylate cellulose dialysis membranes utilizing ethylenimine. While successful in reducing blood clotting by heparinizing the aminoethylated cellulose the process has several disadvantages. The reaction of ethylenimine with cellulose first required a careful solvent exchange which retained the swollen cellulose pore structure and replaced water by a more suitable nonpolar solvent for the ethylenimine reaction. Ethylenimine itself is a highly reactive, volatile and toxic chemical which requires special handling and reaction techniques. The results also showed best results with a low level of amineothylation which according to the probable reactions in the article indicated the preferred form of the treated cellulose contained principally aminoethyl ether groups. When the cellulose contained a high level of nitrogen content the homopolymer which is simultaneously prepared during the amineothylation reaction apparently inhibited the anticoagulation properties of the heparin.

It is an object of this invention to provide a simple method using readily available, nonhazardous materials to impart antithrombogenicity to the surfaces of a variety of materials.

SUMMARY OF THE INVENTION

Accordingly it has been found that high molecular weight polyalkylenimines having a molecular weight of at least about 50,000 may be irreversibly adsorbed to the 9 to of a 1 of materials in an amount sufficient to bind to said surface heparin and like anionic antithrombogenic materials and produce an antithrombogenic surface.

The process of this invention comprises treating said surfaces with a solution of a polyalkylenimine having from 2 to 4 carbon atoms per imine unit and a solution pH of at least about 5. The surface is then washed essentially free of unadsorbed polyalkylenimine and then treated with heparin or like materials to provide an antithrombogenic surface. The invention contemplates both the process and the products thereof. The process also contemplates the prior step of first treating the surface by an acid etch, surface sulfonation or the like to increase the adsorptivity of the surface for said polyalkylenimine. Importantly, the process of this invention may be employed with permeable membranes without any adverse effect on their permeability.

DETAILED DESCRIPTION OF THE INVENTION

Polyalkylenimines useful in the process of this invention contain from 2 to 4 carbon atoms per imine unit. Although the polymers are highly branched, especially high molecular weight polymers, the imine unit may be shown by the nominal formula

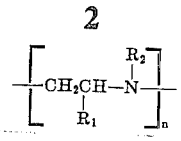

wherein $R_1$ may be hydrogen, a methyl or an ethyl group and $R_2$ may be hydrogen or another imine unit according to the formula. Polymers with a mixture of imine units are also useful, for example a polymer prepared by polymerizing a mixture of ethylenimine and propylenimine. Typical polymers include polyethylenimine and polypropylenimine both of which are commercially available. Polybutylenimine is less readily available but still useful. Because polyethylenimine is both highly effective and lowest in cost it is preferred for use with this invention.

Irreversible adsorption occurs most readily with high molecular weight polyalkylenimines having an average molecular weight of at least about 50,000, preferably 50,000 to 100,000. The polymerization of ethylenimine and like monomers is difficult to control so as to obtain a narrow spread of molecular weights and consequently any such polymer is a mixture of polymers with widely varying molecular weights. The tendency of polyalkylenimines to remain adsorbed to a surface and still retain a sufficient number of cationic sites to additionally attract and bind heparin to the surface decreases rapidly as the molecular weight decreases. Consequently, while some adsorption occurs with lower molecular weight polymers, the advantages and benefits of this invention are dependent on utilizing high molecular weight polymers as defined.

Adsorption of the polyalkylenimine is also a function of solution pH. It has been found that minimal adsorption occurs below about pH 5 and this invention is limited accordingly. The solutions are usually aqueous solutions but said polymers are also soluble in lower alcohols and other polar solvents. The polyalkylenimine products are usually marketed as aqueous solutions.

The invention is illustrated by the following nonlimiting examples where all parts percentages are by weight unless otherwise specified.

EXAMPLE 1

Samples of cellulose film were gently stirred in a 5 percent aqueous solution of polyethylenimine (average molecular weight of about 50,000) having a pH of 9 to 10 for 1 hour. The films were then rinsed with deionized water, then with 0.1 N HCl and then, again with deionized water. Analysis of the films showed a nitrogen content of about 1 percent which corresponds to about 3 percent adsorbed polyethylenimine. Further washing did not alter the nitrogen content.

Some of the treated film samples where then immersed in a 1 percent aqueous sodium heparin solution for one hour, following by thorough washing with water. About 3 percent heparin was retained by the film as indicated by sulfur analysis.

Other samples of the unheparinized film were treated with a dilute solution of sodium trifluoroacetate. Infrared spectra of the thoroughly washed films showed a strong absorption at 6.0μ indicating the presence of trifluoroacetate ion.

Further confirmation of the adsorbed polyethylenimine was obtained by treating other unheparinized film samples with an anionic dye which was readily adsorbed and produced a 7-(4-sulfo-1-napthylazo)-8-hydroxy-5-quinoline surface. The particular dye used is called Snazoxs [7-(4-sulfo-1-naphthylazo)-81-hydroxy-5-quinoline sulfonic acid].

In contrast to the above, cellulose film samples which were not treated with polyethylenimine did not adsorb heparin, trifluoro acetate or said dye.

In a similar manner silicone rubber, polyethylene film and cellulose powder were each treated with polyethylenimine and subsequently with said dye and all showed a marked tendency to adsorb the dye and produce a colored surface. Some of the polyethylenimine-treated treated cellulose powder which was treated with a heparin solution instead of the dye was extensively rinsed with water or dilute sodium chloride solution but there was no measurable loss of heparin from the cellulose powder.

The above results show that polyethylenimine of this molecular weight is irreversibly adsorbed and is capable of binding heparin as well as other anionic ions to the surface.

EXAMPLE 1

Several sections of Bemberg cellulose dialysis tubing, 1 inch in diameter by about 6 inches were stirred gently in a 5 percent aqueous polyethylenimine, similar to example 1, at room temperature for about 2 hours. The tubes were then rinsed thoroughly with deionized water, followed by 0.1 N HCl and then by deionized water again. The tubes were then heparinized by immersion in a solution of 10 grams of sodium heparin in 100 milliliter of water and stirred at room temperature for 1 hour. The tubes were then rinsed with deionized water following by rinsing with 0.9 percent NaCl solution and stored in the latter solution until tested.

Several similar tubes of silicone rubber were prepared by casting and vulcanizing a silicone rubber around the outside of a 1 ×6-inch glass test tube. After curing, the silicone tubes were removed from the test tube and rinsed in acetone followed by a water rinse. The silicone tubes were then treated with polyethylenimine and heparinized in a manner similar to the above treatment for cellulose tubes and stored in a 0.9 percent NaCl solution.

The heparinized silicone rubber tubes were tested for whole-blood-clotting times as compared to similar tubes which were not treated as above. Each of the treated cellulose tubes in the test were knotted at one end and suspended in a 1 ×6-inch glass test tube for testing in two separate trials. Several milliliters of freshly drawn human blood were added to the treated and untreated test tubes and the whole-blood clotting time (WBCT) observed.

| Type Tube | WBCT, minutes* Untreated | Heparinized |
|---|---|---|
| Silicone Rubber | 12–17 | 45–105 |
| Cellulose (Trial 1) | 18 | 43 |
| Cellulose (Trial 2) | 20,16 | 30,30,33 |

*Time to form a coherent clot

The improvement in blood clotting time is evident. It should be remembered that the above were static test and even better results are obtained under dynamic conditions.

Similar results are obtained when the cellulose is in the form of fine, permeable hollow fibers which are useful in blood dialysis and in the manufacture of biomedical devices such as an artificial kidney.

EXAMPLE 3

Two otherwise identical, treated and untreated cellulose tubes similar to Example 2 were filled with citrated human plasma and after an hour's contact the plasma was removed and its thrombin time determined. The thrombin time for the plasma taken from a heparinized tube was 20.1 seconds while that for plasma from an untreated tube was 17.6 seconds, which indicates that little or no heparin was leached from the surface.

EXAMPLE 4

Test similar to those of Example 3 were made with tubes of glass, polypropylene and polycarbonate with the following results.

| Type Tube | Blood* Donor | WBCT, minutes Untreated | Heparinized |
|---|---|---|---|
| Polypropylene | 1 | 11–13 | 90–120 |
|  | 2 | 11–13 | 90–150 |
| Polycarbonate | 1 | 9–10 | 60–120 |
|  | 2 | 11 | 75–120 |
| Glass | 3 | 7–8 | 30–35 |
|  | 4 | 7–8 | 35–45 |

*represents different sources of whole blood.

A great variety of materials may be made antithrombogenic by the process of this invention. Those materials which readily, irreversibly adsorb polyalkylenimines are easily determined by the anionic dye test described in Example 1. An anionic dye or color producing substance may be used in this test provided it produces a color upon interaction with the polyalkylenimine absorbed on the surface. If no polyalkylenimine is adsorbed, no colored surface should result. To give a meaningful test, of course, the dye or the like must not produce a color with the untreated surface.

Suitable substrate materials include polyolefins such as polyethylene, polypropylene, poly-4-methyl-pentene-1 and the like; polyamides; polyacrylates and methacrylates; cellulose esters; polyvinyls, phenolics and the like in addition to the materials already disclosed. disclosed. Additionally, polyalkylenimines are adsorbed to a variety of metals but in some instances such as aluminum the basic character of the polymer has an adverse effect. Accordingly materials where such adverse effect occurs are generally not useful herein.

The invention also contemplates the adsorption of polyalkylenimine to substrates having ionic and acidic sites. Polymeric materials containing such sites may be directly prepared by polymerization of monomers some of which at least contain such groups. A variety of means may be employed to provide these sites, such as etching with acidous solutions, exposing the surface to corona or electrostatic discharge treatments, flame treatment, sulfonation, hydrolysis or partial hydrolysis to provide acidic sites, and the like. With many substrates, however, such surface modification is not necessary.

The uniqueness of the polyalkylenimine treated substrates is demonstrated by tests made similar to Example 1 with polyvinylbenzyltrimethyl ammonium salts or a linear quaternary polyamine of the formula

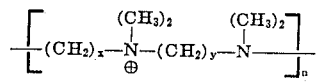

wherein neither polymer was found to adsorb irreversibly to cellulose. If irreversible adsorption was merely a function of the cationic nature of the polymer the above two polymers should work equally as well; however they do not.

With respect to the process, the time of treatment of the substrate surface with the polyalkylenimine is quite variable. In many instances sufficient polyalkylenimine is adsorbed in a matter of a few minutes, although a longer exposure is generally used to insure that an adequate level of adsorption is reached. Exposure times of up to 24 hours or even longer may be used. Temperature appears to be noncritical in that adequate levels of adsorption are obtained at room temperature. Higher temperatures up to even 100° C. may be used but lower temperatures are generally preferred.

Neither does adsorption appear to be dependent on the concentration of the polyalkylenimine solution. With very high molecular weight polymers the concentration may be limited by the solution viscosity, which would be evident to a skilled worker. Generally a concentration of at least about 0.1 percent is utilized and more generally about 1 to 5 percent by weight.

After the polyalkylenimine treatment the surface is washed until essentially free of any unadsorbed polymer. In addition to water washes, which are generally sufficient, the wash step may be supplemented or improved on by a dilute acid wash and/or a dilute base wash followed by a water wash. Isotonic saline solutions may also be used.

Heparinization takes place quite rapidly as well, although an additional small uptake of heparin occurs for up to an hour or so. The heparin uptake appears to vary slightly with concentration of the heparin solution, a higher concentration favoring a more rapid uptake. Generally a heparin solution concentration of about 0.1 to 20 weight percent is employed although this may vary widely up to solubility limits.

The invention is not limited to heparin but contemplates the use of all such anionic antithrombogenic materials. At present few such materials are known and heparin is most commonly used. In this invention heparin is used synonymously with sodium heparin or other soluble heparin salts. A material commonly known as Mepesulfate (sodium salt of sulfated polygalacturonic acid methyl ester methyl glycoside may also be used.

It is usually desirable to wash the heparinized surface with water to remove any loosely bound or unbound heparin. Preferably an isotonic saline solution is used since any residual amounts of said solution will have no significant effect on the blood.

The process of this invention is operable at quite low levels of polyalkylenimine adsorption. Since analysis for nitrogen content in the surface of the article is not readily or rapidly performed it is not convenient to define the invention on any such basis. However, the previously described dye test is qualitatively sufficient to determine whether sufficient adsorption takes place since if a visually discernable color is produced on the surface there is sufficient polyalkylenimine adsorbed to bind heparin and like materials thereto and impart antithrombogenicity properties to said surface.

The process of this invention may also be modified by treating the substrate surface with a solution of said polyalkylenimine and heparin in a 3-5 molar NaCl solution. At this high electrolyte level the heparin does not interfere with the adsorption of the polyalkylenimine on the surface nor does it bond to the polymer. Subsequently the solution is diluted with water whereby the heparin does bond to the polymer-adsorbed surface.

While this invention is useful in manufacturing a variety of ph prosthetic devices it is of particular benefit with biomedical devices, which employ permeable, hollow fine fibers as a separatory membrane, such as a blood oxygenator, artificial kidney and the like. It will be understood that the present invention is not limited to the specific details above but may embody various modifications insofar as they are defined in the following claims.

What is claimed is:

1. A process for imparting antithrombogenicity to materials having a surface capable of irreversibly adsorbing polyalkylenimines thereon, said process comprising
   a. treating said surface with a solution of a polyalkylenimine having two to four carbon atoms per imine unit and an average molecular weight of at least about 50,000 wherein said solution has a pH of at least about 5;
   b. washing said surface essentially free of any unadsorbed polyalkylenimine; and then
   c. treating said surface with an anionic antithrombogenic material.

2. The process of claim 1 wherein said material is cellulose, cellulose ester, silicone rubber, polypropylene, polycarbonate or glass.

3. The process of claim 2 wherein said cellulose is a permeable membrane useful for blood dialysis.

4. The process of claim 3 wherein said membrane is a permeable hollow, fine fiber.

5. The process of claim 1 wherein said polyalkylenimine is polyethylenimine.

6. The process of claim 1 wherein said antithrombogenic material is heparin.

7. The process of claim 1 wherein said washing step (b) comprises a water wash following by a dilute acid wash which is followed by another water wash.

8. The process of claim 1 wherein said washing step (b) utilizes an isotonic saline solution.

9. An article having at least one surface with antithrombogenic properties, said article surface comprising an anionic antithrombogenic material bound to a surface having polyalkylenimines having two to four carbon atoms per imine unit and an average molecular weight of at least about 50,000 irreversibly adsorbed thereon and wherein said surface is essentially free of unadsorbed polyalkylonimine.

10. A process for imparting antithrombogenic properties to materials having a surface capable of irreversibly adsorbing polyalkylenimines thereon, said process comprising.
   a. treating said surface with a 3 to 5 molar sodium chloride solution of an anionic antithrombogenic material and a polyalkylenimine having two to four carbon atoms per imine unit and an average molecular weight of at least about 50,000 wherein said solution has a pH of at least about 5; then
   b. diluting said solution while in contact with said surface whereby said antithrombogenic material bonds to said surface; and
   c. washing said surface essentially free of any unbound polyalkylenimine and antithrombogenic material.

10 The article of claim 9 wherein said antithrombogenic material is heparin.

* * * * *

PO-1050
(5/69)

UNITED STATES PATENT OFFICE
CERTIFICATE OF CORRECTION

Patent No. 3,616,935                Dated      2 November 1971

Inventor(s)    Jim Love and George W. Holmes

It is certified that error appears in the above-identified patent and that said Letters Patent are hereby corrected as shown below:

In the third line of the Abstract, change "silicon" to -- silicone --.

In column 1, line 39, change "amineothylation" to --aminoethylation--; in line 50 delete "9 to of a 1" and insert --surface of a variety--.

Column 2, line 40, insert --and-- between "parts" and "percentages"; line 53 delete "where" and insert --were--; in line 55 delete "lowing" and insert --lowed--; in line 64 delete "7-(4-"; in line 65 delete "sulfo-1-napthylazo)-8-hydroxy-5-quinoline" and insert --colored--; in line 75 delete "treated"; line 67, "81-hydroxy" should read -- 8-hydroxy --.

In column 3, line 10 change "EXAMPLE 1" to --EXAMPLE 2--; in line 21 delete "following" and insert --followed--; in line 73 change "Test" to --Tests--.

In column 4, line 18, delete "An" and insert --Any--; in line 21 delete "absorbed" and insert --adsorbed--; in line 27 insert --polyesters;-- between "like;" and "polyamides;"; in line 29 delete "disclosed."; in line 36 delete "and" and insert --or--.

In column 5, line 47, delete "ph".

In column 6, line 25, delete "following" and insert --followed--; in line 35 delete "polyalkylonimine." and insert --polyalkylenimine.--; in line 50 delete "10" and insert --11--.

In column 1, line 11, delete "of" and insert --in--.

Signed and sealed this 25th day of July 1972.

(SEAL)
Attest:

EDWARD M. FLETCHER, JR.          ROBERT GOTTSCHALK
Attesting Officer                 Commissioner of Patents